United States Patent [19]

Nakatsuka

[11] 4,138,122

[45] Feb. 6, 1979

[54] PICKUP

[75] Inventor: Hisayoshi Nakatsuka, Greve Strand, Denmark

[73] Assignee: Ortofon Manufacturing A/S, Valby, Denmark

[21] Appl. No.: 808,163

[22] Filed: Jun. 20, 1977

[30] Foreign Application Priority Data

Jun. 22, 1976 [DK] Denmark ............................ 2802/76

[51] Int. Cl.[2] ............................................ G11B 3/46

[52] U.S. Cl. ............................................ 274/37

[58] Field of Search ............ 179/100.41 K, 100.41 D, 179/100.41 M, 100.41 Z; 274/37

[56] References Cited

U.S. PATENT DOCUMENTS

| | | | |
|---|---|---|---|
| 3,576,955 | 5/1971 | Obata | 179/100.41 M |
| 3,673,354 | 6/1972 | Oda et al. | 179/100.41 K |
| 3,909,008 | 9/1975 | Sakai | 274/37 |

*Primary Examiner*—Richard E. Aegerter
*Assistant Examiner*—John W. Shepperd
*Attorney, Agent, or Firm*—Fleit & Jacobson

[57] ABSTRACT

A phonograph pickup having an armature supported by a resilient pad which restores the armature to a neutral position after excursions thereof. A further resilient means is provided, which engages the armature at a greater distance from its fulcrum than does the pad. The additional resilient means is made of a material having good damping characteristics.

5 Claims, 2 Drawing Figures

PICKUP

Figure 1:
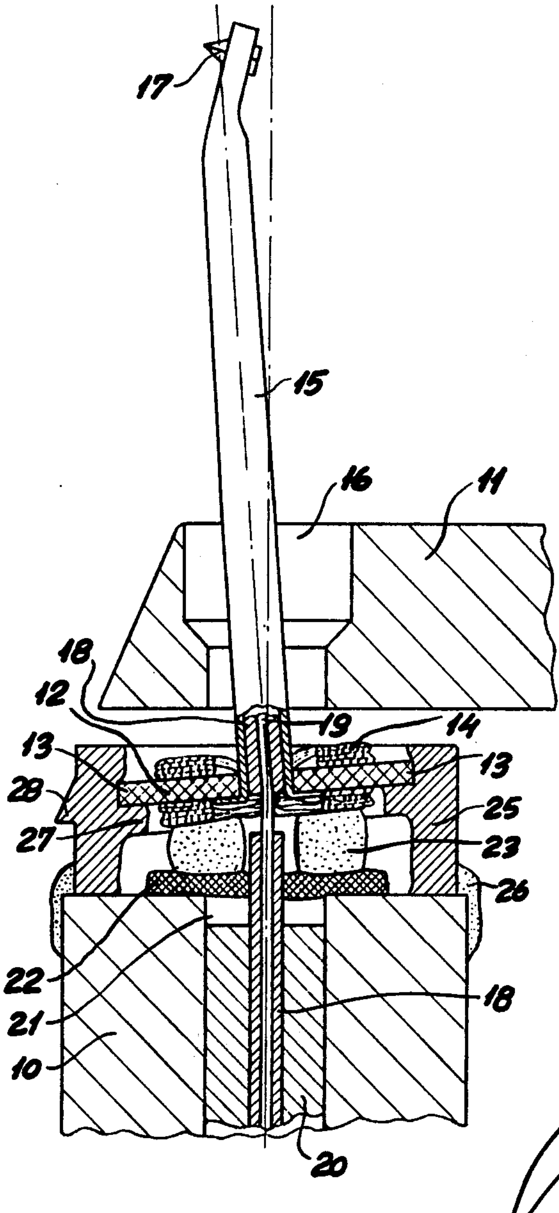

This invention relates to a pickup of the type comprising an armature mounted perpendicularly on the end of a stylus arm and the central portion of which is held in engagement with a firmly supported resilient bearing element with a certain pressure.

In a known pickup of this type the armature is held tightly against a rubber pad provided as bearing element by a nickel plated piano wire, one end of which extends into and is secured in an axial central bore in the end of a pole leg and the other end of which is attached to the end of the tubular stylus arm. Over a short length immediately behind the armature the nickel plating has been removed and this length will form the armature fulcrum about which it can oscillate in all directions in response to the movements of the stylus in a stereo sound track. The rubber pad acts as bearing element and restoring spring which defines the neutral position of the stylus arm and armature. To ensure that the armature fulcrum is fixed and well defined at both low and high frequencies and to provide adequate damping and channel separation the rubber pad shall be relatively rigid and should preferably consist of a relatively hard rubber of high elasticity modulus. If the pad is of a softer rubber it has to be correspondingly tighter compressed. The high rigidity required in the bearing element reduces the compliance and tracking ability of the pickup. In other words, the various functions assigned to the elastic bearing element in the known construction make it necessary in dimensioning, mounting and selection of material for the bearing element to compromise between partly conflicting considerations.

A dynamic pickup with wound armature suffers from the further disadvantage that the armature windings make the side face of the armature abutting on the rubber pad uneven, with the result that the reaction of the rubber pad will not be the same in all directions and the neutral position will be less well defined than desirable.

It is the object of the present invention to provide a pickup of the said type which makes it possible to combine a well defined bearing for the oscillating system with good tracking and damping properties to provide a smooth frequency response with good channel separation and low distortion.

This object has been accomplished by further providing one or more firmly supported rubber members abutting on one of the movable members of the pickup at a greater distance from their fulcrum and with a lower pressure than the resilient bearing element. In this construction the damping and partly the restoring function are performed by the additional rubber member or members, which can be adapted specifically to serve that purpose. The invention, in other words offers the designer increased possibilities of selecting desired properties in designing a pickup and thus leads to less compromised solutions.

The additional rubber member or members will contribute to restoring the armature to neutral position with considerable effect because they engage the armature with a greater moment arm than does the bearing element. A further advantage of the additional rubber member or members is that they prevent or at any rate highly impede torsional vibrations of the stylus arm and armature, thus eliminating or attenuating the crosstalk caused by such vibrations.

In case of a dynamic pickup the invention involves the still further advantage that the additional rubber member or members can be caused to engage the armature outwardly of the windings so that the unevenness caused by the windings will not result in directional irregularities.

The additional rubber member or members should preferably consist of a relatively soft synthetic rubber having a relatively high attenuation effect, because the desired degree of intrinsic attenuation can be imparted to synthetic rubber.

In an embodiment of the pickup which is particularly expedient the additional rubber is formed as a sleeve against which edge portions of the armature abut. The said rubber sleeve is easy to manufacture and mount and engages the armature right out at its edges where the moment arm is longest and the effect therefore greatest.

A particularly good contact between the armature and the rubber sleeve is obtained by a construction in which the sleeve is provided on its inner face with a peripheral flange against which the edge portions of the armature abut.

The stylus pressure at which a pickup engages a gramophone record displaces the stylus arm and armature from the rest position. To ensure that the armature will be in the neutral position after this displacement the rubber pad may be suitably unsymmetrical and the upper face of the sleeve flange may extend in a plane forming an angle slightly less than 90° with the sleeve axis.

Figure 2:
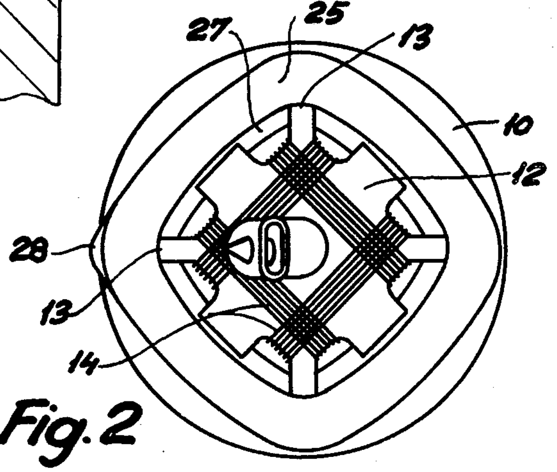

The invention will be explained in greater detail below with reference to the drawing, in which FIG. 1 presents a longitudinal section through part of an embodiment of the pickup according to the invention and FIG. 2 presents an end view of the same pickup with the yoke removed.

The drawing shows the end portion 10 of a cylindrical pole leg which conducts the magnetic flux from a permanent magnet (not shown) to the air gap between the end face of the pole leg and a yoke 11 placed opposite said end face and returning the flux to the magnet. In the air gap is provided a flat substantially square armature 12 having a projection 13 in each corner. The armature may consist of magnetizable or non-magnetizable material and is provided with two windings 14 perpendicular to one another for generating signals in respective stereo channels. The armature is secured to the rear end of a tubular stylus arm 15 extending through a central aperture in the armature and through an opening 16 in the yoke 11 and carrying at its front end a stylus 17. To the rear end of the stylus arm 15 is attached one end of a piano wire 19 provided with a nickel plating 18 and the other end of which is secured in a sleeve 20 which in turn is secured in an axial central bore 21 in the end of the pole leg 10. The nickel plating 18 is removed over a short distance immediately adjacent to the armature 12. Between the pole leg 10 and the armature 12 is interposed a rubber pad 22 abutting on the pole leg and a rubber pad 23 abutting on the armature winding. Both the said rubber members are provided with a central aperture for the nickel plated piano wire and are made from a relatively hard rubber of high elasticity moduleus. The armature 12 is held firmly pressed against the pad 23 by the tension of the piano wire 19.

Between the armature 12 and the pole leg 10 is, according to the invention, further provided a rubber sleeve 25 consisting of a relatively soft synthetic rubber of high intrinsic attenuation capacity. In relaxed state this sleeve is substantially cylindrical with a slightly smaller external diameter than the pole leg 10, to the end face of which it is secured by means of an adhesive 26. The sleeve is provided inwardly with a peripheral flange 27 against which the corner projections 13 of the armature abut. When the armature is introduced into the sleeve the upper portion of the sleeve will be deformed to an approximately square cross-section as shown in FIG. 2. The flange 27 forms an angle of 3°-5° with the end faces of the sleeve so that the armature 12 and the stylus arm 15 in the illustrated state of rest assume a position in which their axis forms the same angle with the axis of the pole leg 10. This angle is adjusted so that the stylus arm and armature will be urged by the normal stylus pressure into a position co-axial with the pole leg.

To facilitate accurate mounting of the sleeve 25 it is provided outwardly with a marking nose 28 opposite the lowest point of the flange 27.

All armature movements will cause compression of both the rubber sleeve 25 and of the rubber pad 23 and for that matter also of the rubber disc 22 whose main object, however, is to bridge the bore 21 in the pole leg 10. Without the sleeve 25 it would be necessary to dampen the natural vibrations of the pickup by making the pad 23 of a relatively hard rubber, but this would impede the tracking ability of the pickup. The attenuation of the natural vibrations by the sleeve 25, the material and dimensioning of which are selected first and foremost with a view to this function, makes it possible to preserve the good tracking ability of the pickup and at the same time to provide the desirable attentuation. It will be seen that the corner projections 13 of the armature extend slightly into the sleeve 25. This serves to prevent or at any rate to strongly reduce cross-talk producing vibrations of the armature about its own axis, that is torsional vibrations about the piano wire 19.

The structural details of the illustrated and described pickup may be modified in many ways within the scope of the invention. The wound armature, for instance, may, if desired, be replaced by a soft-iron armature or by a permanent magnet in a magnetic pickup or by an insulating plate with conductive coating in an electrostatic pickup. Instead of the illustrated rubber sleeve acting upon the armature might be used a rubber bushing positioned in an opening 16 in the yoke and adapted to act upon the stylus arm. Further the rubber disc 22, the rubber pad 23 and the rubber sleeve 25 might be manufactured as a single, substantially cup shaped element with a central column corresponding to the pad 23 and of such height that it would be compressed more than the outer cylindrical portion when the armature unit was mounted.

What I claim is:

1. A pickup of the type having a stationary pole leg with one end of a wire secured thereto and the other end affixed to the movable system of the pickup, comprising a stylus arm having a stylus affixed at the front end and the other end of said wire affixed to the rear end and also having an armature secured to the rear end of said stylus arm for defining a fulcrum of said movable system, said armature being supported by a resilient bearing means engaging on one side with a central portion of said armature and on the other side with said stationary pole leg, characterized in that there is further provided one or more resilient elements supported by said stationary pole leg for engaging with said movable system at a greater distance from said stationary pole leg than said fulcrum and with a lower pressure than said resilient bearing means.

2. A pickup according to claim 1, characterized in that the one or more resilient elements consist of relatively soft synthetic rubber having a relatively high attenuation effect.

3. A pickup according to claim 1, characterized in that one of said one or more resilient elements is formed as a sleeve engaging at one end with portions of the armature and at the opposite end with said stationary pole leg.

4. A pickup according to claim 3, characterized in that the sleeve is provided on its inner face with a peripheral flange against which the edge portions of the armature abut.

5. A pickup according to claim 4, characterized in that the upper face of the flange extends in a plane forming an angle of slightly less than 90° with the sleeve axis.

* * * * *